(12) United States Patent
Cheng et al.

(10) Patent No.: US 12,489,394 B2
(45) Date of Patent: Dec. 2, 2025

(54) PHOTOVOLTAIC OUTER COVER COMPONENT FOR VEHICLE AND METHOD FOR MANUFACTURING SAME

(71) Applicant: FLEXTECH COMPANY, Hubei (CN)

(72) Inventors: Xiaolong Cheng, Wuhan (CN); Yupeng Gui, Wuhan (CN); Shuangshuang Cai, Wuhan (CN)

(73) Assignee: FLEXTECH COMPANY, Wuhan (CN)

(*) Notice: Subject to any disclaimer, the term of this patent is extended or adjusted under 35 U.S.C. 154(b) by 764 days.

(21) Appl. No.: 17/844,422

(22) Filed: Jun. 20, 2022

(65) Prior Publication Data

US 2023/0179140 A1 Jun. 8, 2023

(30) Foreign Application Priority Data

Dec. 7, 2021 (CN) .......................... 202111482689.2

(51) Int. Cl.
| | | |
|---|---|---|
| *H02J 7/00* | (2006.01) | |
| *B60L 8/00* | (2006.01) | |
| *H02S 10/40* | (2014.01) | |
| *H02S 20/00* | (2014.01) | |
| *H02S 30/10* | (2014.01) | |

(52) U.S. Cl.
CPC .............. *H02S 30/10* (2014.12); *B60L 8/003* (2013.01); *H02S 10/40* (2014.12); *H02S 20/00* (2013.01)

(58) Field of Classification Search
None
See application file for complete search history.

(56) References Cited

U.S. PATENT DOCUMENTS

| | | |
|---|---|---|
| 5,651,837 A | 7/1997 | Ohtsuka et al. |
| 5,998,729 A | 12/1999 | Shiomi et al. |
| 6,320,115 B1 | 11/2001 | Kataoka et al. |
| 6,331,673 B1 | 12/2001 | Kataoya et al. |
| 7,749,351 B2 | 7/2010 | Kataoka et al. |
| 2020/0058812 A1* | 2/2020 | Zhou ............... H10F 19/902 |

FOREIGN PATENT DOCUMENTS

| | | |
|---|---|---|
| CN | 106046709 A | 10/2016 |
| CN | 112011156 A | 12/2020 |

\* cited by examiner

*Primary Examiner* — Arun C Williams
(74) *Attorney, Agent, or Firm* — Birchwood IP

(57) ABSTRACT

Provided are a photoelectric outer cover component for a vehicle and a method for manufacturing the same, which relate to the technical field of photoelectric hybrid vehicles. The outer cover component is formed by laminating and bonding a skin, a solar cell module, a front film and so on. The outer cover component is molded as a whole to fit with the molding of other components of a frame, and the outer cover component is thin in thickness, small in weight and high in reliability.

7 Claims, 2 Drawing Sheets

PHOTOVOLTAIC OUTER COVER COMPONENT FOR VEHICLE AND METHOD FOR MANUFACTURING SAME

CROSS-REFERENCE TO RELATED APPLICATION(S)

This application claims priority to Chinese Patent Application No. 202111482689.2 filed Dec. 7, 2021, the disclosure of which is incorporated herein by reference in its entirety.

TECHNICAL FIELD

The present disclosure relates to the technical field of photoelectric hybrid vehicles and in particular, to a photovoltaic outer cover component for a vehicle and a method for manufacturing the same.

BACKGROUND

With the development of solar photovoltaic cell technology, solar photovoltaic cells have found an increasingly wide application in various fields, among which photovoltaic vehicles are one of the research hotspots. To meet the lighting requirements, photovoltaic assemblies are typically incorporated into the outer cover component of vehicles.

The outer cover component assembly of the vehicle is a component of the body of the vehicle. The primary goal of the design of the cover assembly is to meet certain structural performance requirements such as rigidity and strength as well as achieving certain functions. According to the structure type, the outer cover component of the vehicle may be divided into two types: the skin outside the frame and the combination of inner and outer panels, and the outermost member of the cover component is the skin. Because the appearance of the vehicle is mostly designed as a complex and special-shaped curved surface, the composition structure of the outer cover component of the vehicle, such as the skin, generally requires 4 to 6 stamping forming processes such as blanking, pre-bending, drawing, trimming, piercing, flanging and shaping. The outer cover component assembly of the vehicle is a component of the body of the vehicle. The primary goal of the design of the cover assembly is to meet certain structural performance requirements such as rigidity and strength as well as achieving certain functions. According to the structure type, the outer cover component of the vehicle may be divided into two types including the skin outside the frame and the combination of inner and outer panels, and the outermost member of the cover component is the skin. Because the appearance of the vehicle is mostly designed as a complex and special-shaped curved surface, the composition structure of the outer cover component of the vehicle, such as the skin, generally requires 4 to 6 stamping forming processes such as blanking, pre-bending, drawing, trimming, punching, flanging and shaping.

At present, a solar photovoltaic assembly and a vehicle outer cover component are mainly combined in the following ways, which includes an assembly application, a paste application and an integration application.

In the assembly application, a conventional flat glass solar photovoltaic assembly is assembled onto the surface of a vehicle outer cover component via a structural component. Since the conventional assembly is usually packaged with glass, the load of the vehicle is increased, which seriously affects the appearance design and safety of the vehicle.

In the paste application, a flexible solar photovoltaic assembly is pasted to a single curved surface leveling member using a weatherable structural adhesive, and then the member is assembled onto the surface of a vehicle outer cover. Compared with the assembly application of common assemblies, the weight is greatly reduced and the single curved surface style is achieved. However, the surface of the vehicle body is generally a double curved surface or even a special-shaped surface, the solar photovoltaic module, as an additional device on the surface of the vehicle body, still affects the original appearance design of the vehicle.

In the integration application, an integrated solar photovoltaic assembly replaces the outer cover component or the outer cover skin of the vehicle to meet the style design of the vehicle appearance and enable the surface components to obtain the power generation function. Compared with the first two applications the assembly application and the paste application, this application can solve the problem of the style design perfectly. However, the integrated solar photovoltaic assembly is mostly made of glass or polycarbonate (PC) which can be used for the style design, so the preforming treatment such as modeling and surface treatment is required, which greatly increases the cost of the assembly product and increases the load of the vehicle.

SUMMARY

In view of this, in the present disclosure, a partially formed vehicle body outer skin is used as the substrate of a backing plate, an adhesive, a solar cell module and a ultra-thin flexible polymer front film are attached on the skin, and the integrated vacuum hot pressing process is used for fabrication so that the solar cell piece fits with the appearance of the vehicle and has the advantages of thin thickness, small weight and high reliability.

To achieve the above object, the solutions of the present disclosure are specifically described below.

A photovoltaic outer cover component for a vehicle is provided. The photovoltaic outer cover component includes a front film layer, a first adhesive layer, a solar cell module, a second adhesive layer, and a vehicle body outer skin which are stacked in sequence. Where the front film layer, the first adhesive layer, the solar cell module, the second adhesive layer, and the vehicle body outer skin form a stacked structure, the stacked structure is an integrated structure and is consistent with the shape of the vehicle body outer skin, and the solar cell module includes a plurality of cell pieces connected in series or in parallel with each other.

Preferably, the vehicle body outer skin is the outermost structure of a vehicle body and is a non-planar skin plate which is subjected to pretreatment, and the pretreatment includes one or more of blanking, pre-bending, drawing, trimming, punching, flanging and shaping.

Preferably, the vehicle body outer skin is made of metal, an insulating layer and a third adhesive layer are configured between the second adhesive layer and the vehicle body outer skin, and the insulating layer is formed by splicing a plurality of insulating material sheets; and the material of the insulating layer is a polyester film material having the electrical apparatus insulation property, which may be polyethylene terephthalate or polyvinylidene fluoride. Preferably, the front film layer is a multilayer film structure and includes at least two of a hardening coating, a weatherable film layer and a barrier layer.

The weatherable film layer is a flexible polymer composite film whose elongation at break is greater than or equal to 300%, and the weatherable film is preferably a polymer flexible film material such as polytetrafluoroethylene, an ethylene-chlorotrifluoroethylene copolymer, an ethylene-tetrafluoroethylene copolymer and the like.

The hardening coating is connected with the upper surface of the weatherable film layer, and the coating is used for strengthening the surface hardness of the front film layer and improving its scratch resistance; and the coating may be an acrylic polyester coating, a polyurethane coating or other coatings that can strengthen the surface hardness.

The barrier layer is adhered to the lower surface of the weatherable film layer and may be a polyethylene terephthalate (PET) film.

Preferably, a reinforcing layer and a fourth adhesive layer are configured between the first adhesive layer and the solar cell module, and the reinforcing layer is formed by splicing a plurality of reinforcing material sheets. The reinforcing layer is a polyester fiber composite material, which can maintain a certain rigid strength after curing and protect the solar cell module from failure risks such as cracks and fragments of cell pieces caused by external impact. More preferably, the reinforcing layer may be an acrylic polyester glass fiber composite, which of course is not limited thereto.

Another aspect of the present disclosure provides a method for manufacturing the photovoltaic outer cover component described above. The method includes the following steps.

A front film layer is modelled so that the shape and the size of the modelled front film layer are consistent with a vehicle body outer skin.

A solar cell module is fabricated by cutting cell pieces, connecting the cut cell pieces in series to form cell strings, connecting a plurality of cell strings in series or in parallel with each other, and leading an electrode terminal of a main grid welding belt out to an outgoing line position through a bus bar.

Each material layer is laid on the vehicle body outer skin in sequence, and the vehicle body outer skin is conveyed into a laminating machine for lamination.

A connector is electrically connected with an outgoing line of the solar cell module.

Preferably, the vehicle body outer skin has been preliminarily formed through some processes before the lamination, and those processes include: performing blanking, pre-bending, drawing, trimming, punching and shaping on a skin sheet material, where the shaping is that the arrangement area of solar cell pieces is shaped after punching. The vehicle body outer skin is one of metal, glass fiber reinforced plastic or carbon fiber. The metal is specifically commonly used metal that meets specification standards of vehicles, including low carbon steel, aluminum alloy, glass fiber reinforced plastic, carbon fiber, magnesium alloy, titanium alloy and the like.

Preferably, the method of molding the front film layer includes: cutting a front film layer, placing and fixing the cut front film layer in a prefabricated blow molding mold, heating a front film until a surface temperature of the front film rises to 80-110° C., switching on a vacuum extraction valve so that the front film is evenly spread and tiled on an inner surface of the mold according to the shape in the blow molding mold, and cooling the font film for later use. More preferably, the temperature is 90-100° C.

Preferably, the lamination includes the following steps.

A laid assembly is placed on a vacuum extraction device at a charge position of the laminating machine, subjected to pre-vacuum extraction, and kept for 3-10 minutes when a flexible silicone bag of the vacuum extraction device is completely applied to a design shape of a product and a vacuum degree reaches −95 KPa.

The assembly is put into a laminating machine for vacuum hot pressing, where the parameters are as follows:

at a first stage: 90-100° C. and 5-15 minutes;
at a second stage: 110-120° C. and 5-15 minutes; and
at a third stage: 135-150° C. and 30-60 minutes.

The hot-pressed assembly is cooled in a vacuum state.

The edge area of the laminated assembly is bent to form a bending part for connecting with other parts of the frame. The bending method specifically includes the following: a part of the to-be-crimped positions of the outer cover component are heated using infrared to make the surface temperature of the front film layer reach 110-130° C. and then quickly bent after heating is stopped. Where the bending part only includes a front film material, an adhesive and a skin.

Preferably, the solar cell module includes solar slice cell pieces, a main grid welding belt, a bus bar and a bypass diode. The sliced cell obtained by equally slicing the conventional standard solar cell piece, which may be a half slice, a third slice, a quarter slice or a tenth slice. The types of solar cells may be monocrystalline silicon solar cells, polycrystalline silicon solar cells, amorphous silicon heterojunction (HJT) solar cells or other laminated solar cells, and may also be thin film solar cells (amorphous silicon, copper indium gallium selenium, gallium arsenide, cadmium telluride, perovskite and the like) or solar cells adopting other technologies.

The adhesive is a high weatherproof polymer material and is used for adhering the front film, the solar cell module and the skin and filling the gap between the two-layer structure to form a reliable internal structure and may be an ethylene-vinyl acetate copolymer, a polyolefin elastomer, polyvinyl butyral or 2,4,6-trimethylbenzoyl-diphenylphosphine oxide, where the polyolefin elastomer is preferably a polymer of ethylene and butene or a polymer of ethylene and octene, which is not limited thereto.

The present disclosure has beneficial effects described below.

(1) The lamination process is performed after the stamping molding process of the outer cover component skin and before the flanging and bending processes, which not only avoids the splitting of the solar cell piece in the skin molding process, but also ensures the beauty and service life of the vehicle outer cover component.

2) The pre-molding on the front film which serves as a protective layer ensures the smoothness of the laminated front film and the front film to be wrinkle-free.

3) The cell pieces in the solar cell module are cut according to the shape of the outer cover component skin before lamination and then connected in series or in parallel, and the insulating layer and the reinforcing layer are arranged in a splicing manner, thereby effectively avoiding the problems of cell splits, folds of photovoltaic assemblies and the like.

4) The lamination is performed before crimping, which ensures the integrity of the front film layer and improves the weatherability of the vehicle outer cover component.

DETAILED DESCRIPTION

Solutions of the present disclosure will be further described in conjunction with drawings and embodiments.

Embodiment One

Figure 1:
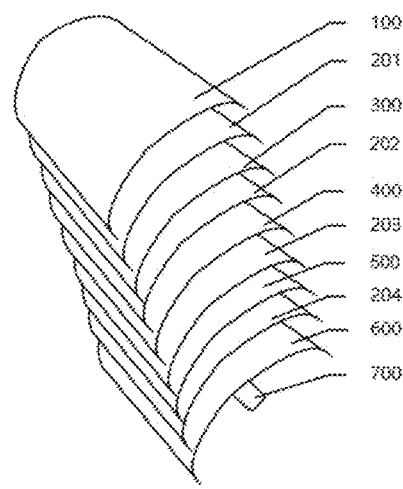
FIG. 1 is a structural diagram of a vehicle outer cover component prepared in an embodiment of the present disclosure.

As shown in FIG. 1, starting from the light receiving surface, the product layer structure of the vehicle outer cover component includes, from top to bottom, a front film layer 100, a first adhesive layer 201, a reinforcing layer 300, a fourth adhesive layer 202, a solar cell module 400, a second adhesive layer 203, an insulating layer 500, a third adhesive layer 204, an outer cover component skin 600 and a connector 700 in sequence.

Figure 2:
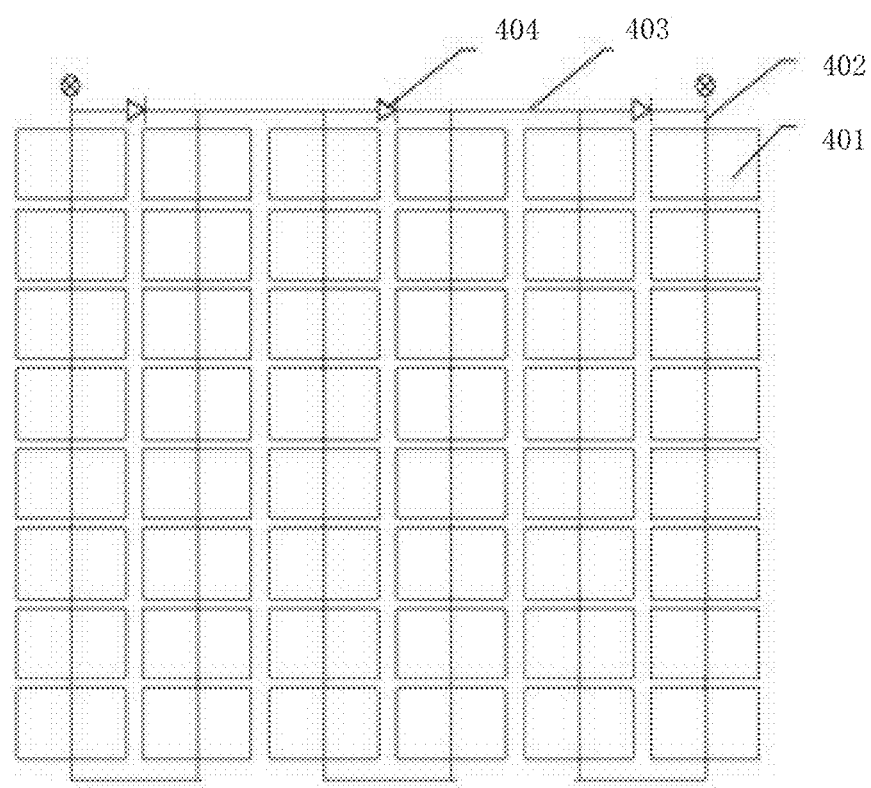
FIG. 2 is a structural diagram of a solar cell module.

The solar cell module 400 is a core power generation component, and as shown in FIG. 2, includes solar slice battery pieces 401, a main grid welding belt 402, a bus bar 403 and a bypass diode 404. The sliced cell obtained by equally slicing the conventional standard solar cell piece, which may be a half slice, a third slice, a quarter slice or a tenth slice. The size of the sliced cell is determined according to the requirements of the skin curved surface and the local modeling design.

In this embodiment, the front film layer 100 is a polytetrafluoroethylene film (that is, a weatherable film layer), the first adhesive layer 201, the fourth adhesive layer 202, the second adhesive layer 203 and the third adhesive layer 204 are all polyvinyl butyral (PVB) films, the reinforcing layer 300 is made of an acrylic polyester glass fiber composite, the insulating layer 500 is made of polyethylene terephthalate, the sizes of the reinforcing layer 300 and the insulating layer 500 are both smaller than the sizes of the front film and the substrate but larger than the size of the solar cell module 400, and the outer cover component skin 600 is made of metal.

Specifically, the vehicle outer cover component is prepared through the following steps.

(1) A front film layer 100 is molded by cutting a front film according to a required design size (it is necessary to ensure that the edge of the front film completely covers the edge of the vehicle outer cover component skin), placing and fixing the cut front film in a prefabricated blow molding mold, heating the front film until the surface temperature of the front film rises to 80-110° C., preferably 90-100° C., switching on a vacuum valve so that the front film is evenly spread and tiled on the inner surface of the mold according to the shape in the blow molding mold, and cooling the surface temperature of the font film below 60° C. for later use. The shape and the size of the molded front film are consistent with the shape and the size of the outer cover component skin 600.

(2) The supplied conventional cell pieces are equally sliced using a special device for cutting solar cell pieces, and the cell pieces are conveyed into a series welding machine to string the cell pieces to form cell strings. Then, a plurality of cell strings are connected in series or in parallel, and the electrode terminal of the main grid welding belt is led out to the outgoing line position through the a bus bar so that the solar cell model 400 is fabricated.

(3) The preformed outer cover component skin is placed in a lamination laying area, each material layer is laid in sequence above the skin, the cooled front film layer 100 as well as the blow molding mold is covered on the laminated module, the periphery of the front film is fixed, the front film 100 is demoulded from the blow molding mold, and the lamination laying is completed.

The preformed outer cover component skin is a component formed after a skin sheet material is subjecting pre-bending, drawing, trimming and punching in the stamping forming process.

Further, in order to adapt the materials of the reinforcing layer 300 and the insulating layer 500 to the shape of the vehicle outer cover component skin, in this embodiment, the materials of the reinforcing layer 300 and the insulating layer 500 are cut into sheets and the spliced, and the gap between adjacent sheets is less than 0.5 mm.

(4) The laid assembly is placed on a vacuum extraction device at the charge position of the laminating machine, the vacuum extraction device is sealed and performs pre-vacuum extraction, and the laid assembly is kept for 3-10 minutes, preferably, 5-7 minutes, when the flexible silicone bag of the vacuum extraction device is completely applied to the design shape of a product and a vacuum degree reaches −95 KPa.

(5) The laminated assembly is put into a laminating machine for vacuum hot pressing, where the parameters of the laminating machine are as follows:

at a first stage: 90-100° C. and 5-15 minutes;
at a second stage: 110-120° C. and 5-15 minutes; and
at a third stage, performing vacuum hot pressing at 135-150° C. for 30-60 minutes.

Through the above vacuum hot pressing, the product quality can be effectively controlled, and the stability of the product process and the production yield can be improved.

6) The laminated assembly is placed in a cooling area together with the vacuum extraction device and subjected to the vacuum cooling until the surface temperature drops below 60° C., and the vacuum extraction device is opened to take out the laminated assembly.

7) The to-be-bent areas at the edge position of the assembly are locally heated using infrared, and the heating is stopped when the surface temperature at the position reaches 110-130° C., and then the heated areas are bent according to the design to form a bending part.

It is to be noted that the bending part should only include the front film, an adhesive and the vehicle outer cover component skin so that the assembly can still obtain good water resistance and will not suffer from the cell piece crazing after bending; since the bending angle of the edge of the outer cover component skin may reach 180° at most, a great tensile stress will be applied to the cooled and cured polymer material at the bending positions, which may even lead to material fracture failure and lack of protection on the assembly. Therefore, in this embodiment, a part of the front film is heated so that the cured adhesive obtains fluidity again, thereby effectively avoiding the fracture failure of the photovoltaic assembly when bending.

In this way, the adhesive layer is softened by local heating and then quickly bent to avoid the problem of front film fracture.

(8) The connector 700 is mounted. Since the connector 700 is the core component of electrical output, the waterproof level of the connector 700 needs to meet or even superior to IP67, and meanwhile, the connection reliability needs to be ensured and meet the requirements of specification standards of vehicles.

Embodiment Two

The difference from Embodiment one is that the front film is an ethylene-chlorotrifluoroethylene copolymer film, and the adhesive 201, the adhesive 202, the adhesive 203 and the adhesive 204 are all ethylene-vinyl acetate (EVA) copolymer films.

Embodiment Three

The difference from Embodiment one is that the insulating layer 500 and the reinforcing layer 300 are not cut and directly laminated as a whole plate.

Embodiment Four

The difference from Embodiment one is that the front film is not subjected to pretreatment and molding and directly laminated.

The upper and lower surfaces of the photovoltaic assemblies for the vehicle prepared in Embodiment one and Embodiment two are adhered to each other, the front film has no wrinkles, and the front film at the bending positions has no fracture. The photovoltaic assembly prepared in Embodiment three has problems such as wrinkles on the front film, bubbles, cell splits and the like. The front film of the photovoltaic assembly prepared in Embodiment four has wrinkles.

Embodiment Five

The difference from Embodiment one is that the front film material is an ethylene-tetrafluoroethylene copolymer film (that is, a weatherable film layer), a polyurethane coating is coated on the surface of the weatherable film layer, and the coating is prepared before the step of modeling the front film. The method for manufacturing the coating is as follows: a front film material is bonded with a PET layer through EVA at a crosslinking and bonding temperature of 60-90° C., the surface of the front film is modified by oxygen plasma extraction (the discharge power is 100 W, and the modification duration is 20-120 seconds), then a solution containing polyurethane is coated on the surface of the front film by a spraying method, and the coated solution is dried to obtain a polyurethane coating with a coating thickness of 10-930 microns; then, the adhesive layer of the material is heated to the temperature of 100-110° C., and PET is removed after the EVA layer is softened.

Since although ETFE has excellent weather resistance, it is easy to be scratched by gravel when it is applied on the surface of the vehicle cover component, after a hardening coating is made on the surface of ETFE, the hardness of the material can reach more than 2H, which effectively ensures the service life of the cell assembly within the photovoltaic outer cover component.

Embodiment Six

The difference from Embodiment five is that the front film material includes a polyurethane coating layer, an ethylene-tetrafluoroethylene copolymer film layer and a PET film in sequence from top to bottom, the size of the PET film is smaller than the size of the ethylene-tetrafluoroethylene copolymer film layer and is fixed only at the plane of the ethylene-tetrafluoroethylene copolymer film layer by an adhesive.

The structure of such a front film layer has a better scratch resistance effect and a better water vapor barrier effect.

The solutions of the present disclosure are described through the embodiments described above but are not limited thereto. It should be apparent to those skilled in the art that any improvements made to the present disclosure, equivalent replacements of raw materials of the product of the present disclosure, additions of adjuvant ingredients to the product of the present disclosure, and selections of specific manners, etc., all fall within the protection scope and the disclosed scope of the present disclosure.

What is claimed is:

1. A photovoltaic outer cover component for a vehicle, comprising a front film layer, a first adhesive layer, a solar cell module, a second adhesive layer, and a vehicle body outer skin which are stacked in sequence;
   wherein the front film layer, the first adhesive layer, the solar cell module, the second adhesive layer, and the vehicle body outer skin form a stacked structure, the stacked structure is an integrated structure and is consistent with a shape of the vehicle body outer skin, and the solar cell module comprises a plurality of cell pieces connected in series or in parallel with each other;
   wherein a reinforcing layer and a fourth adhesive layer are configured between the first adhesive layer and the solar cell module, and the reinforcing layer is formed by splicing a plurality of reinforcing material sheets.

2. The photovoltaic outer cover component according to claim 1, wherein the vehicle body outer skin is an outermost structure of a vehicle body and is a non-planar skin plate which is subjected to pretreatment, and the pretreatment comprises one or more of blanking, pre-bending, drawing, trimming, punching, flanging and shaping.

3. The photovoltaic outer cover component according to claim 1, wherein the vehicle body outer skin is made of metal, an insulating layer and a third adhesive layer are configured between the second adhesive layer and the vehicle body outer skin, and the insulating layer is formed by splicing a plurality of insulating material sheets.

4. The photovoltaic outer cover component according to claim 1, wherein the front film layer is a multilayer film structure and comprises at least two of a hardening coating, a weatherable film layer and a barrier layer, and a size of the barrier layer is smaller than a size of the weatherable film layer.

5. A method for manufacturing the photovoltaic outer cover component according to claim 1, comprising:
   modeling a front film layer so that a shape and a size of the front film layer are consistent with the vehicle body outer skin;
   fabricating a solar cell module by cutting cell pieces, connecting the cut cell pieces in series to form cell strings, connecting the cell strings in series or in parallel, and leading an electrode terminal of a main grid welding belt out to an outgoing line position through a bus bar;
   laying each material layer on the vehicle body outer skin in sequence, and conveying the vehicle body outer skin laid with each material layer into a laminating machine for lamination; and
   electrically connecting a connector with an outgoing line of the solar cell module;
   wherein when the vehicle body outer skin is made of metal, after the lamination is completed, performing infra-red heating on a part of the laminated assembly, and crimping the laminated assembly, wherein the crimping is performed on the front film layer, an adhesive and the vehicle body outer skin.

6. The method according to claim 5, wherein a method of molding the front film layer comprises: cutting a front film material, placing and fixing the cut front film material in a prefabricated blow molding mold, heating a front film until a surface temperature of the front film rises to 80-110° C., switching on a vacuum extraction valve so that the front film material is evenly spread and tiled on an inner surface of the mold according to a shape in the blow molding mold, and cooling the font film material for later use.

7. The method according to claim 5, wherein the lamination comprises the following steps:
   placing a laid assembly on a vacuum extraction device at a charge position of the laminating machine, performing pre-vacuum extraction, and keeping for 3-10 minutes when a flexible silicone bag of the vacuum extraction device is completely applied to a design shape of a product and a vacuum degree reaches −95 kilopascal (KPa);
   putting the assembly into a laminating machine for vacuum hot pressing according to following steps:
   at a first stage, performing vacuum hot pressing at 90-100° C. for 5-15 minutes;
   at a second stage, performing vacuum hot pressing at 110-120° C. for 5-15 minutes; and
   at a third stage, performing vacuum hot pressing at 135-150° C. for 30-60 minutes; and
   cooling the hot-pressed assembly in a vacuum state.

* * * * *